United States Patent [19]

Cunningham et al.

[11] 4,069,470
[45] Jan. 17, 1978

[54] USE OF PERIODIC SIGNALS FOR CONTINUOUS WAVE SEISMIC PROSPECTING

[75] Inventors: Allen B. Cunningham; Edward T. Miller, both of Houston, Tex.

[73] Assignee: Exxon Production Research Company, Houston, Tex.

[21] Appl. No.: 708,675

[22] Filed: July 26, 1976

[51] Int. Cl.² .............................................. G01V 1/14
[52] U.S. Cl. ........................... 340/15.5 TA; 181/119; 340/15.5 CP
[58] Field of Search ............. 340/15.5 CP, , 15.5 TA; 181/119

[56] References Cited

U.S. PATENT DOCUMENTS

| | | | |
|---|---|---|---|
| 3,289,154 | 11/1966 | Cunningham | 340/15.5 TA |
| 3,303,458 | 2/1967 | Prickett, Jr. et al. | 340/15.5 TA |
| 3,307,648 | 3/1967 | Masterson | 340/15.5 TA |
| 3,353,624 | 11/1967 | Redding | 340/15.5 TA |
| 3,697,938 | 10/1972 | Taner | 340/15.5 TA |

*Primary Examiner*—Howard A. Birmiel
*Attorney, Agent, or Firm*—E. Eugene Thigpen

[57] ABSTRACT

A seismic signal is generated having a pattern which is periodically repetitive. The signal within each period has a nonrepetitive pattern and each period has a time duration not less than the time required for the seismic wave to travel to the deepest subsurface strata of interest and back to the detecting location.

6 Claims, 8 Drawing Figures

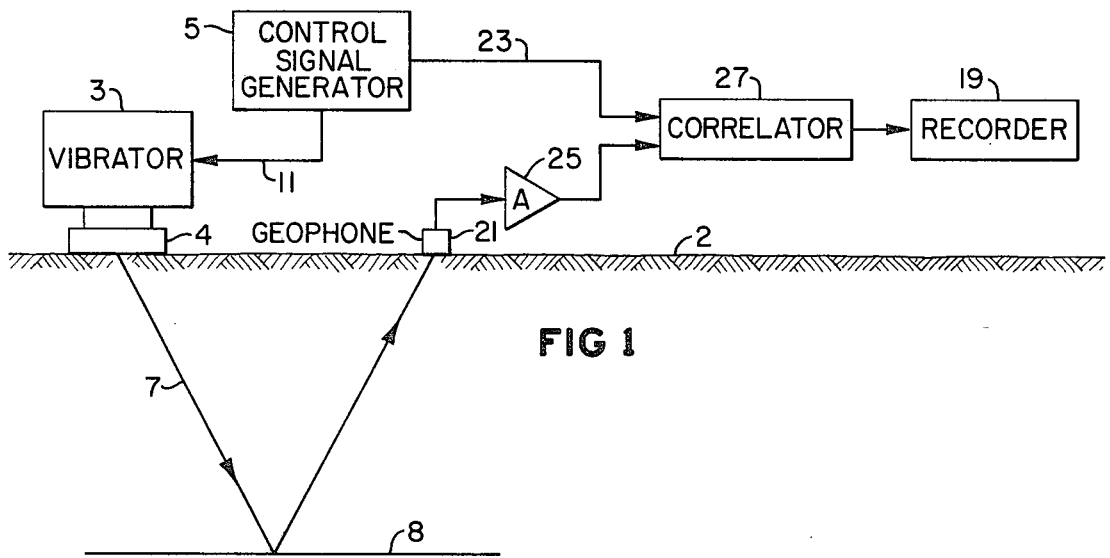
FIG 1
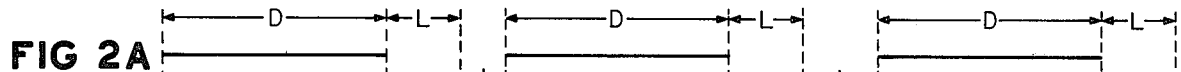
FIG 2A
FIG 2B
FIG 2C
FIG 3A
FIG 3B
FIG 4A
FIG 4B

USE OF PERIODIC SIGNALS FOR CONTINUOUS WAVE SEISMIC PROSPECTING

BACKGROUND OF THE INVENTION

1. Field of the Invention

The present invention relates to seismic prospecting. More particularly, it relates to a system for increasing the efficiency of data gathering operations.

2. Description of the Prior Art

In the past, the most common method for generating elastic wave energy for seismic prospecting has been to generate a sharp energy pulse using a source such as dynamite. In this method of seismic prospecting, all of the elastic wave energy is injected into the earth at substantially the same time, and the seismic energy reflections from subsurface reflecting interfaces are detected at one or more surface locations. It is necessary to wait until all the returning seismic signals have been recorded before generating the next energy pulse so that a given seismic recording will not contain reflected signals from two sources, thus making it difficult to determine the reflecting interfaces responsible for the signals.

Hydraulically or electromagnetically driven vibrators are now commonly used for generating seismic signals. Reflected seismic energy from subsurface reflecting interfaces is detected by geophones or other seismic detectors, and travel time of the seismic wave is determined by cross-correlating the detected signal with the transmitted signal. Because the seismic energy level generated by such vibrators is low, a long vibratory signal must be generated to impart sufficient energy for the signals resulting from reflections from subsurface interfaces to be distinguishable from noise. It is well known to those skilled in the art that to determine the depth of a particular reflecting interface, the injected seismic signal must be unique (i.e., nonrepetitive) for a time at least as long as the longest travel time to be measured.

One method for developing sufficient reflected energy is to inject a plurality of vibratory cycles into the earth. Following each cycle, vibrations cease until such time as all the reflected energy of interest has returned to the surface. After the reflected signals from each cycle are recorded, a new cycle is initiated. The signals representing the detected energy from each vibratory cycle are "stacked" or summed with signals from previous cycles. This method is similar to seismic prospecting with dynamite in that a signal is generated and then signal generation stops until all reflections of interest have been recorded and then another signal is generated.

Another method of generating sufficient energy is to vibrate continuously long enough so that the detected signal, when correlated with the transmitted signal, has enough energy for seismic reflections to be distinguishable from noise. This method requires less prospecting time than the method wherein a plurality of shorter vibratory cycles are transmitted, but more recording and storage space is needed to store the transmitted and received signals.

SUMMARY OF THE INVENTION

A periodic seismic signal, one that is repeated at precise intervals, is transmitted into the earth. The period must be not less than the longest travel time of the seismic signal from the transmitting location to the deepest subsurface location of interest and back to the detecting location. The period may preferably be chosen to be substantially equal to the longest travel time of interest between transmitting and detecting locations.

Normally the seismic signal will be transmitted continuously at each transmitting location until the desired amount of seismic energy is injected into the earth. Typically, the detected seismic signal is "stacked" or summed, as it is received. Each time segment of the received signal, equal to a period of the transmitted signal, is summed or stacked with such preceding segments.

It is an object of this invention to reduce seismic prospecting time. It is a further object of this invention to reduce recording capacity requirements. It is another object of this invention to reduce signal processing costs.

BRIEF DESCRIPTION OF THE DRAWINGS

FIG. 1 illustrates apparatus useful in practicing the invention.

FIGS. 2A, 2B, and 2C graphically illustrate the typical nonperiodic technique as practiced in the prior art.

FIGS. 3A and 3B graphically illustrate the use of a periodic signal for seismic prospecting as disclosed herein.

FIGS. 4A and 4B illustrate a signal pattern useful in practicing the invention.

DESCRIPTION OF THE PREFERRED EMBODIMENT

In practicing this invention, a seismic signal which is nonrepetitive for a length of time not less than the longest travel time from the transmitting location to the deepest subsurface location of interest and back to the detecting location is injected into the earth. The selected pattern is repeated periodically until the desired amount of seismic energy is injected. The signal period will normally be the maximum time required for the seismic signal to travel from the transmitting to the detecting location along any ray path by which it reaches the detecting location at usable energy levels. Normally the seismic signal will be transmitted continuously without rest or listening pauses until the desired amount of seismic energy has been transmitted at each location.

Apparatus useful in practicing this invention is illustrated in FIG. 1. A vibrator 3 is positioned on the earth's surface 2 at a transmitting location. Such vibrators normally utilize an earth coupling plate 4 that is reciprocably driven by a piston and cylinder assembly. An electrohydraulic servovalve controls the relative motion between the piston and cylinder in response to an electrical input control signal.

A geophone 21 is shown positioned at a detecting location. Although a single geophone is shown for simplicity, a plurality of interconnected geophones are typically used at a detecting location. Normally, a plurality of detecting locations are used which may be located at spaced apart positions on either or both sides of the vibrator. Seismic waves travel down into the earth along a variety of ray paths, such as ray path 7, and a portion of the seismic energy is reflected from subsurface interfaces, such as interface 8, upwardly to the detecting locations.

A control signal generator 5 generates the electrical input control signal for the vibrator. This control signal is shown coupled to the vibrator by electrical leads 11. The control signal generator is typically a minicomputer such as model SPC16/50 manufactured by General Automation. Methods of utilizing such a computer to generate the vibrator input control signal are well known to the art.

The electrical output signals from geophones are of small amplitude and normally need to be amplified prior to use in seismic analysis. Such an amplifier 25, which may be of conventional design, is shown connected to the output of detector 21.

Travel time of the seismic wave from the surface to subsurface reflecting interfaces, and consequently, the depth of the reflecting interfaces is normally determined by cross-correlating the detected signal with the transmitted signal. FIG. 1 shows the amplified geophone output signal and a signal from control signal generator 5, which is representative of the signal transmitted into the earth, connected to inputs of correlator 27. The output from the correlator is recorded for use in seismic analysis. The minicomputer used for generating the vibrator input control signal can also be programmed to perform the signal correlation. If desired the geophone output signal may be recorded directly and the correlation performed later at a data processing facility.

One signal pattern that is useful in practicing this invention is a binary coded sine wave of maximal length. A binary code of maximal length has a bit pattern in which any sequence of "$n$" bits does not repeat for a sequence of $2^n - 1$ bits. For example, for "$n$" equal to 4, any sequence of four bits does not repeat during any sequence of fifteen bits. A typical binary code for "$n$" equal to 4 is shown in FIG. 4A and the corresponding sine wave, whose phase is determined by the code, is shown in FIG. 4B. The transmitted signal during a ONE bit interval is of the opposite phase from the phase of the transmitted signal during a ZERO bit interval. To practice the invention disclosed herein using a binary coded sine wave, "$n$" might typically be chosen to be 8 or 10. For "$n$" equal to 8, each period of the transmitted signal will be $2^8 - 1 = 256 - 1 = 255$ bits long, and any sequence of 8 bits will be nonrepetitive within each period. The 255 bit code would be repeated periodically until the desired amount of seismic energy is injected into the earth at each location. For a more complete discussion of binary codes of maximal length see "The Synthesis of Linear Sequential Code Networks," D. A. Huffman, Proc. Third London Symposium on Information Theory, September 1955; as well as U.S. Pat. Nos. 3,264,606, Crook et al, and 3,234,504, Wischmeyer.

The advantage of the invention described herein will be more apparent from the following example. Typically, 8 seconds is required for a seismic signal to travel from the transmitting location to the maximum depth of interest and back to the detecting location. With a typical vibrator in use at the present time, a seismic signal is injected into the earth for 384 seconds at each location in order to obtain the needed reflected energy. The signal is injected in 16 different sweeps of 24 seconds each. Following each sweep, there is a lapsed time of at least 8 seconds for the reflected seismic signal to die out before the next vibration cycle is initiated. Thus the time required at each location is at least 16 (24 + 8) = 512 seconds.

Three cycles of a typical vibratory sequence as utilized in the prior art are graphically illustrated in FIGS. 2A and 2B. Each transmission cycle is of duration D which, as stated above, may typically be 24 seconds. Seismic reflections are received during the 24 seconds of transmission and thereafter for the additional time required for the latter portion of the transmitted signal to travel downward to the deeper reflecting interfaces and back to the detector. This additional time, typically 8 seconds, is shown in FIG. 2B as "L", or "listen" time. Following the listen time the second transmission cycle can be initiated, and so on. FIG. 2A shows the transmission time for three transmission cycles and FIG. 2B shows the detection times. The reflected signals from successive cycles are normally summed together prior to permanent recording, so that a recording space equivalent to the time interval D + L is required for permanent recording. FIG. 2C indicates this recording time, labeled $R_1$.

If 1 minute is allowed to move the vibrator from one location to the next, a total of at least 572 seconds is required for each location. Typically, a seismic exploration crew might move 660 feet between locations, so that, during an 8 hour work day, a crew could cover a maximum of 6.29 miles. Typically, some additional time, shown as $d_1$ and $d_2$ in FIG. 2A, will lapse between the end of the listen time for one cycle and the beginning of the following transmission cycle, which further reduces data gathering efficiency.

With the use of a periodic signal as disclosed herein, and illustrated in FIGS. 3A and 3B only 392 seconds is required at each location (384 seconds of vibration time plus 8 seconds to allow for the return of all reflected signals of interest) to inject equivalent energy into the earth. Allowing one minute to move from one location to the next, 452 seconds are required for each location. And, based on 660 feet between locations, a crew could cover 7.96 miles in 8 hours, a significant improvement.

The period length of the periodic signal need be no longer than the "listen" time, "L". As shown in FIG. 3, a signal pattern is repeated during each period "L". Ideally, the period is selected to be substantially equal to, although not less than, the longest travel time of a seismic signal of interest between the transmitting and detecting locations.

As compared to the seismic prospecting methods used in the prior art, the invention described herein offers savings in recording capacity requirements, as well as in prospecting time. In the example from the prior art discussed above, a signal of 32 seconds duration would be recorded. With the method described herein, a signal the length of one period "L" which, typically, is only 8 seconds, is recorded. Reflecting signals received during subsequent periods of length "L" are stacked or summed with the signals received during all other such periods. A recording space, $R_2$, equivalent to only the time interval "L", is required for permanent recording, as shown in FIG. 3B. And since data processing costs are related to the quantity of recorded data, data processing costs may also be reduced.

Other signal patterns may also be utilized to practice the invention. For example, the swept sine wave, the most commonly generated vibratory seismic signal, may simply be repeated in a periodic manner. When injecting such sine waves, it may be desirable to begin the period at a first frequency, $f_1$, then vary the frequency, either to a higher or lower frequency, $f_2$, at the mid-point of the period then return to the initial frequency, $f_1$, at the end of the period. The frequency at the beginning of a period, therefore, will be the same as the frequency at the end of the preceding period. This method will avoid the need to change instantaneously between frequencies $f_1$ and $f_2$, which would be required for a periodic sweep which varied from the highest frequency at the beginning of a period to the lowest frequency at the end of a period (or vice versa).

It is understood that the invention is not to be limited to the specific embodiments set forth herein, but only by the scope of the attached claims.

What is claimed is:

1. In a method of seismic prospecting wherein a vibratory seismic signal is transmitted into the earth from a first location and reflections of the signal from the subsurface are thereafter detected at a second location, the improvement comprising:

transmitting a periodically repetitive seismic signal wherein the signal within each period thereof is nonrepetitive and each period has a time duration not less than the travel time of the seismic signal from the transmitting location to the deepest subsurface location of interest and back to the detecting location, said signal being transmitted continuously until the desired amount of seismic energy has been transmitted at a location;

detecting reflections of the transmitted signal at at least one detecting location;

summing together time segments of the detected signal, said time segments being equal to a period of the transmitted signal; and recording said summed signal.

2. The method of claim 1 wherein each periodically repetitive signal corresponds to a binary coded sine wave.

3. The method of claim 1 wherein the period is substantially equal to the time required for the seismic signal to travel from the transmitting to the detecting location along any ray path by which it reaches the detecting location at usable energy levels.

4. In a method of seismic prospecting wherein a vibratory seismic signal is transmitted into the earth from a first location and reflections of the signal from the subsurface are thereafter detected at a second location, the improvement comprising:

transmitting a periodically repetitive seismic signal wherein the signal within each period thereof is nonrepetitive and each period has a time duration not less than the travel time of the seismic signal from the transmitting location to the deepest subsurface location of interest and back to the detecting location, said signal being transmitted continuously until the desired amount of seismic energy has been transmitted at a location;

detecting reflections of the transmitted signal at at least one detecting location;

summing together time segments of the detected signal, said time segments being equal to a period of the transmitted signal;

correlating a signal corresponding to the transmitted signal with the summed detected signal; and recording the signal resulting from said correlation.

5. The method of claim 4 wherein each periodically repetitive signal corresponds to a binary coded sine wave.

6. The method of claim 4 wherein the period is substantially equal to the time required for the seismic signal to travel from the transmitting to the detecting location along any ray path by which it reaches the detecting location at usable energy levels.

* * * * *